US 6,523,769 B2

(12) United States Patent
Hamaue et al.

(10) Patent No.: US 6,523,769 B2
(45) Date of Patent: Feb. 25, 2003

(54) SEAT BELT SPOOLING DEVICE

(75) Inventors: Tetsuya Hamaue, Tokyo (JP); Hiroki Takehara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/878,912

(22) Filed: Jun. 13, 2001

(65) Prior Publication Data

US 2002/0017582 A1 Feb. 14, 2002

(30) Foreign Application Priority Data

Jun. 16, 2000 (JP) ........................ 2000-181772

(51) Int. Cl.[7] ................. B65H 75/48; B60R 22/36; A62B 35/00
(52) U.S. Cl. ................. 242/374; 280/806; 297/478
(58) Field of Search ............... 242/374; 280/806, 280/807; 297/476, 478

(56) References Cited

U.S. PATENT DOCUMENTS

| 4,444,010 | A |   | 4/1984  | Bendler .................... 60/407 |
| 5,690,295 | A |   | 11/1997 | Steinberg et al. ........... 242/374 |
| 5,881,962 | A |   | 3/1999  | Schmidt et al. ............ 242/374 |
| 5,924,640 | A | * | 7/1999  | Hickey .................... 242/374 |
| 6,345,504 | B1 | * | 2/2002 | Takehara et al. ........... 60/638 |
| 6,363,722 | B1 | * | 4/2002 | Takehara et al. ........... 60/632 |
| 2001/0040199 | A1 | * | 11/2001 | Takehara et al. ....... 242/374 |
| 2002/0040582 | A1 | * | 4/2002 | Kameyoshi et al. ...... 60/632 |
| 2002/0053621 | A1 | * | 5/2002 | Shiotani et al. ......... 242/374 |
| 2002/0060261 | A1 | * | 5/2002 | Kameyoshi et al. ...... 242/374 |

FOREIGN PATENT DOCUMENTS

| DE | 695 14 649.1 T2 | 4/1995 |
| DE | 199 09 938 | 8/2000 |
| EP | 0 680 856 | 3/1995 |
| JP | 11-208415 A | 5/1999 |
| WO | WO 95/27638 | 10/1995 |
| WO | WO95/27638 A1 | 10/1995 |
| WO | WO 96/25310 | 8/1996 |

* cited by examiner

Primary Examiner—Kathy Matecki
Assistant Examiner—Minh-Chau Pham
(74) Attorney, Agent, or Firm—Foley & Lardner

(57) ABSTRACT

A seat belt spooling device having a ball type pretensioner. The pretensioner includes a case and a ball-receiving member formed integrally with each other. The ball receiving member includes a guide formed integrally with the ball-receiving member. The guide is positioned to guide balls entering into the ball-receiving member from the case, thereby reducing the number of components and the assembling cost.

6 Claims, 9 Drawing Sheets

SEAT BELT SPOOLING DEVICE

BACKGROUND OF THE INVENTION

The present invention relates to seat belt spooling devices for spooling seat belts for automobiles and the like. More particularly, the present invention relates to a seat belt spooling device including a pretensioner.

A seat belt spooling device which includes a pretensioner for applying a tensile force (pretension) to a seat belt by spooling the seat belt by a predetermined length in a case of collision or the like is known.

Such a pretensioner is disclosed in, for example, WO95/27638 (incorporated by reference herein), in which balls are moved in the peripheral direction by gas ejected from an inflator, and a locomotive faculty rotates a reel or spool in a direction for spooling the seat belt.

FIGS. 8 and 9 are illustrations of a seat belt spooling device included in the above WO95/27638.

As shown in FIG. 8, a pretensioner for rotating a belt spooling shaft (reel) 10 includes a pair of driving wheels 11 and 12 capable of holding balls therebetween which move by an explosive force. The driving wheel 11 is firmly connected to the belt spooling reel 10. The driving wheel 12 opposes the driving wheel 11. The wheels 11 and 12 are connected to each other via a gear 31. A casing 13 is provided between the two driving wheels 11 and 12. The casing 13 includes sword-shaped guides 14 and 15. The casing 13 encloses the peripheries of the driving wheels 11 and 12 at an inner face 30 of the casing 13. As shown in FIG. 9, the driving wheels 11 and 12 are provided with cup-shaped concaves 23 disposed in series in the peripheral direction.

A tube 16 bent in a U-shape is provided so as to enclose the casing 13, the tube 16 receiving balls 18 for rotating the driving wheels 11 and 12. A gas generator 17 is provided at an end of the tube 16. Gas ejected from the gas generator 17 pushes the balls 18 out of the tube 16. A driving piston 19 provided with a seal is disposed at an end of the row of the balls 18 and in the tube 16. A tube cover 20 is disposed at the other end of the row of the balls 18. The tube 16 is provided with a cap 22 mounted thereto from the outside.

When the gas generator 17 starts operating, the ejected gas pushes the balls 18 in the tube 16 out of the tube 16. The balls 18 are guided from an opening 28 by the sword-shaped guide 15 of the casing 13 and are pushed into the cup-shaped concaves 23 of the driving wheels 11 and 12, thereby driving the driving wheels 11 and 12 to rotate the reel 10 in the seat-belt-spooling direction. The balls 18 are removed by the sword-shaped guide 14 which serves as a scraper and are collected. Reference numeral 29 denotes an outlet region.

With regard to FIGS. 1 and 2 of WO95/27638, the publication does not contain a clear description of the position in which the balls removed by the sword-shaped guide 14 are received. FIG. 8 in WO95/27638 shows a structure of a pretensioner for driving the spooling shaft 10 to rotate by moving the balls 18 by using gas ejected from an inflator 65, and introducing the balls 18 into a receptacle 71 via a guide nozzle 70 after the balls 18 have been brought into contact with the spooling shaft 10, as shown in FIG. 10.

FIGS. 5 to 7 show a known pretensioner of a seat belt spooling device having such a receptacle. In FIGS. 5 to 7, a ball-receiving member 2 is formed integrally, by aluminum die-casting or the like, with a case 1 having a substantially circular concave part 1a for holding balls (not shown in FIGS. 5 to 7). A ball-passing port 3 is provided between a ball-receiving member 2 and the concave part 1a. The ball-receiving member 2 is disposed under a reel or spool 9 so that the overall size of a seat belt retractor is as smallest as possible.

The ball-receiving member 2 has an opening 2a toward the outside of the case 1, through which a mold for die-casting is disposed. An inclined guide plate 4 is provided so as to prevent the balls from moving out through the opening 2a and to guide the balls coming in from the concave part 1a through the passing port 3 to an end of the ball-receiving member 2. An axle (not shown) of the reel 9 extends to the outside of the case 1 through an axle-pass-through-hole 1b formed in the case 1, and is connected to a return spring (not shown) at the end of the axle of the reel 9, the return spring urging the reel 9 in the seat-belt-spooling direction.

In the known pretensioner shown in FIGS. 5 to 7, the guide plate 4 must be manufactured separately from the case 1 and the ball-receiving member 2, the case 1 and the ball-receiving member 2 being formed integrally with each other, and be disposed at the opening 2a and fixed thereto.

Therefore, an object of the present invention is to provide a seat belt spooling device that does not require a separate non-integral guide plate.

SUMMARY OF THE INVENTION

According an embodiment of the present invention a seat belt spooling device is provided. The device includes a frame having a pair of sidewalls; a reel disposed between the pair of sidewalls, for spooling a seat belt. A resilient member is provided for urging the reel in the spooling direction. The device further includes a pretensioner for driving the reel to rotate in the spooling direction in an emergency; and a locking structure for locking the reel in the emergency. The pretensioner includes a driven shaft connected to the reel; balls disposed along one of the sidewalls and around the periphery of the driven shaft. A gas generator is provided for applying pressure of gas to the balls so as to move around the periphery of the driven shaft. A ball-receiving member for receiving the balls which move into the ball-receiving member is provided. The ball-receiving member extends from the one of the sidewalls to the other one of the sidewalls, and an opening is formed toward an end in the extending direction of the ball-receiving member, the opening opposing the other one of the sidewalls.

The case and the ball-receiving member may be formed integrally with each other by casting so as to have a guide face, so that it is not necessary to use a separate guide plate.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
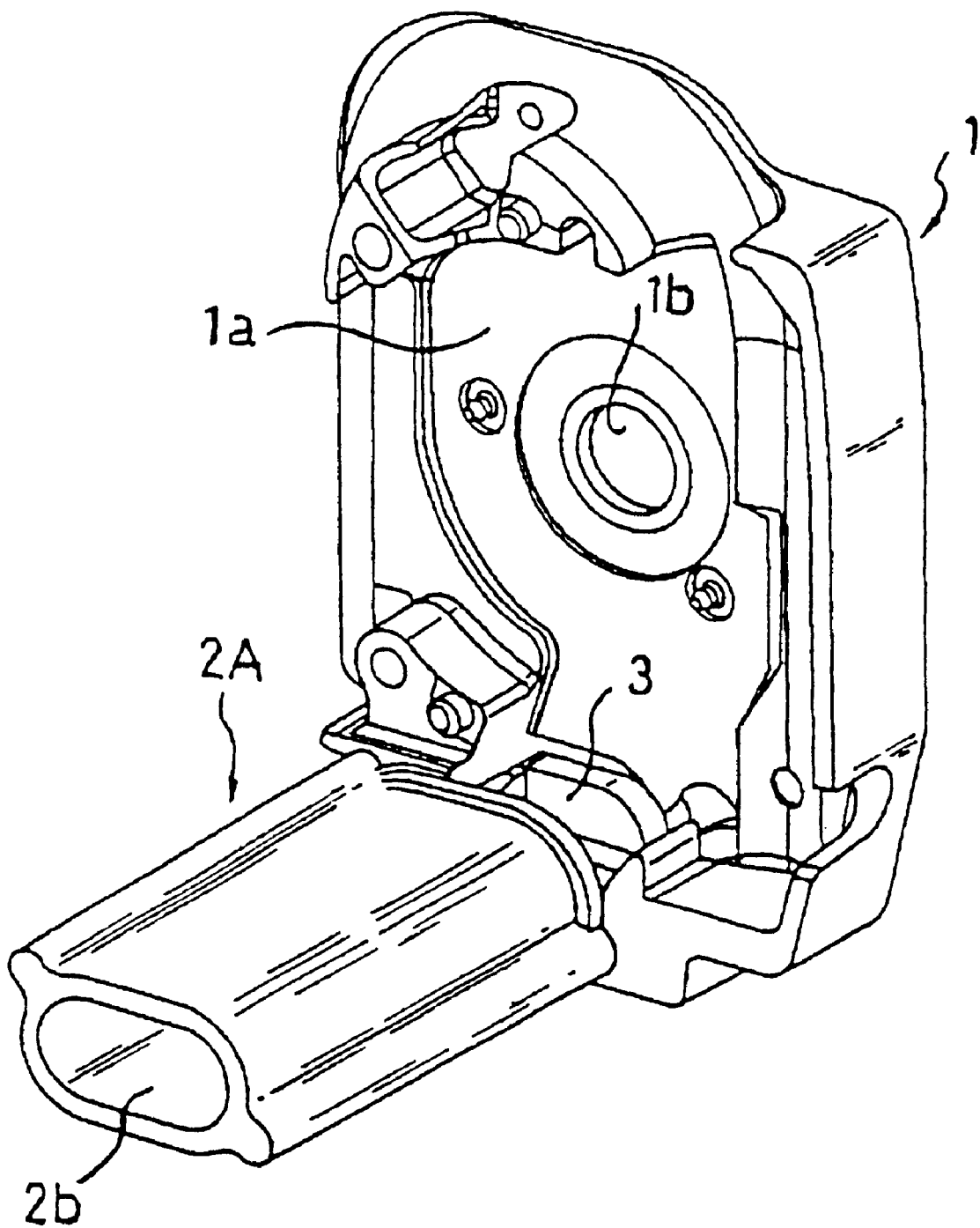
FIG. 1 is a perspective view of a case and a ball-receiving member of a seat belt spooling device according to the present invention.
Figure 2:
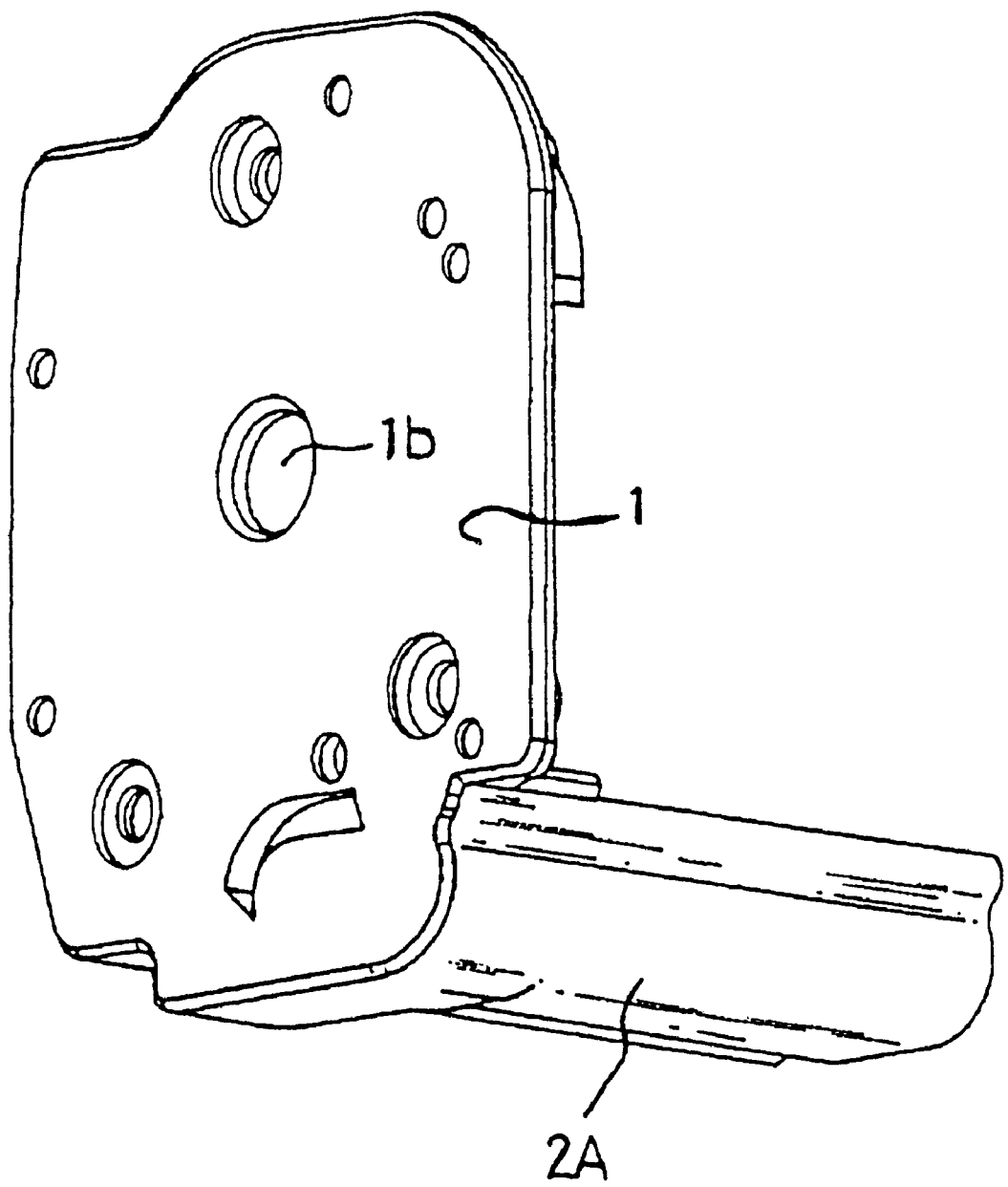
FIG. 2 is a perspective view from the opposite side of the case and the ball-receiving member of the seat belt spooling device shown in FIG. 1.
Figure 3:
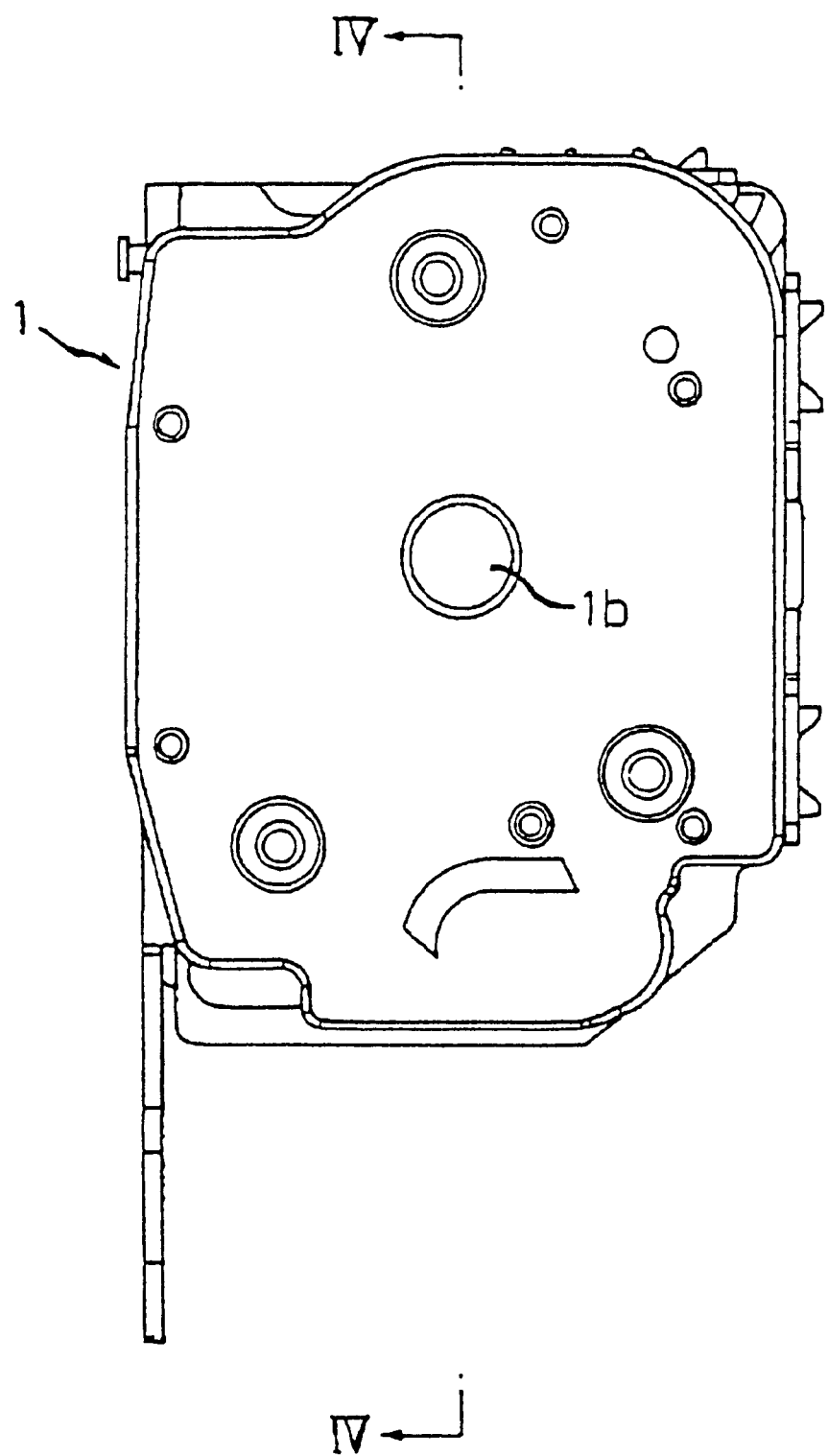
FIG. 3 is a left side view of an assembly of the case, the ball-receiving member, and a frame of the seat belt spooling device according to the present invention.
Figure 4:
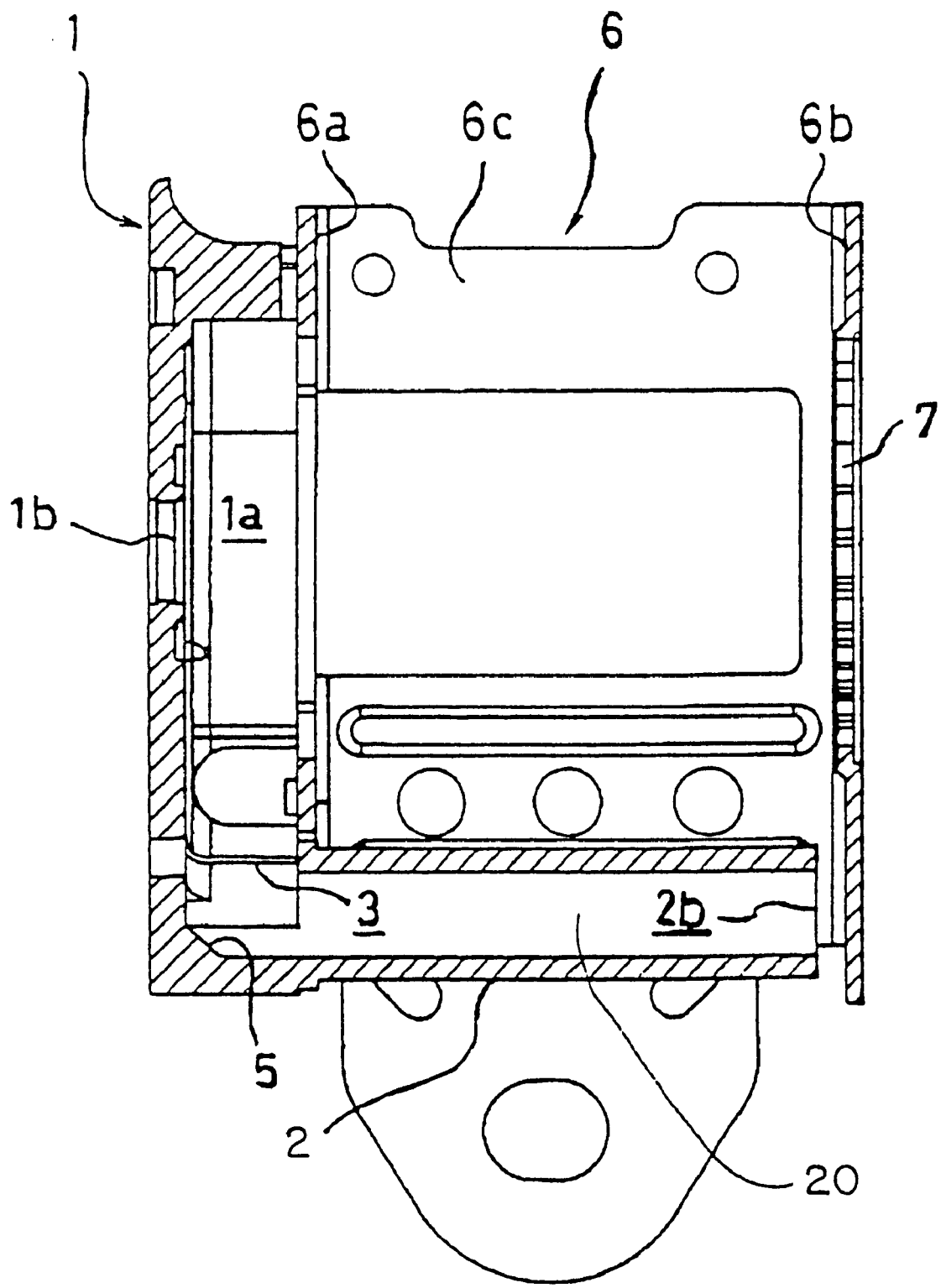
FIG. 4 is a sectional view along line IV—IV of the assembly of the case, the ball-receiving member, and the frame of the seat belt spooling device shown in FIG. 3.
Figure 5:
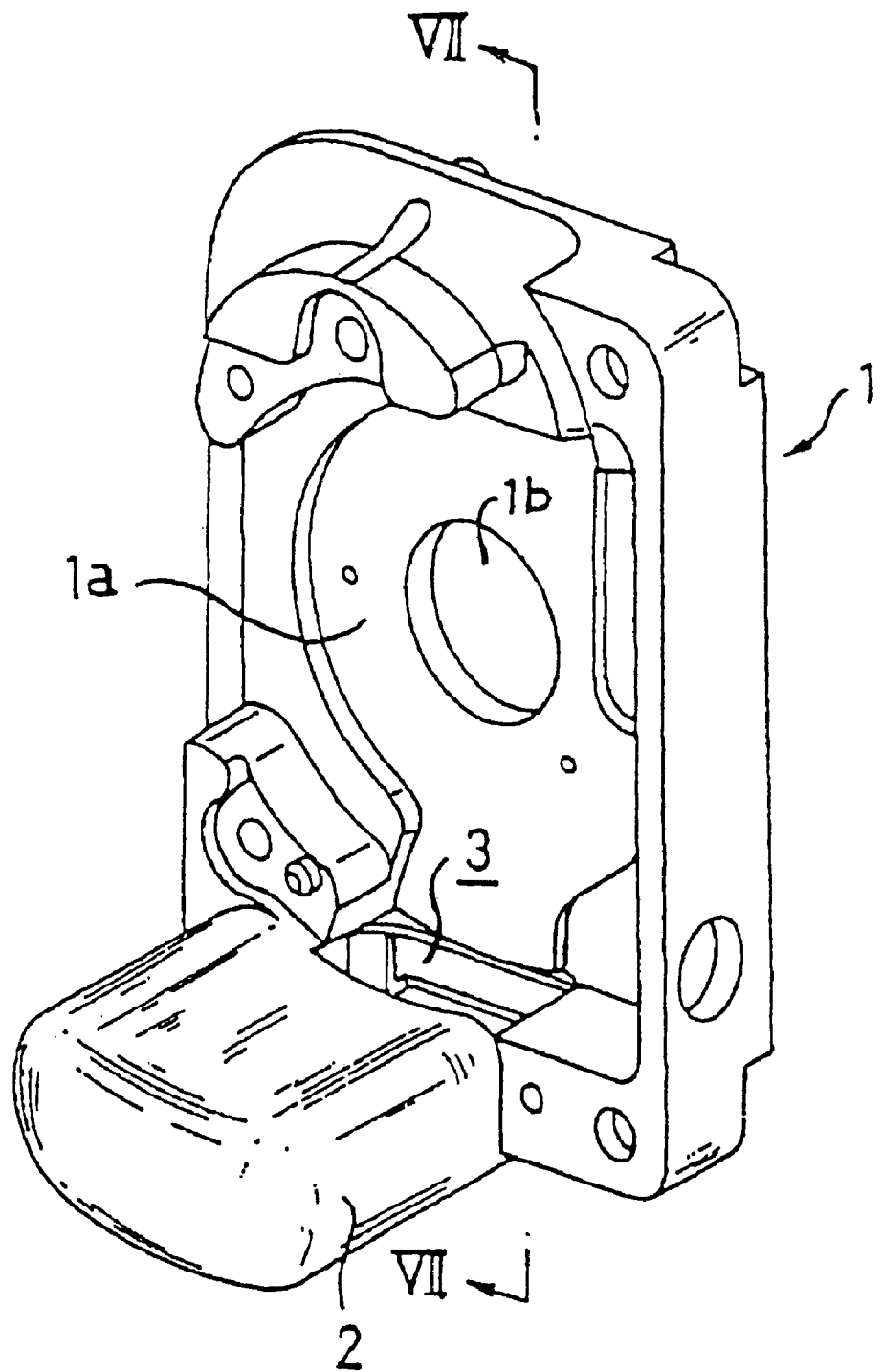
FIG. 5 is a perspective view of a case and a ball-receiving member of a known seat belt spooling device.
Figure 6:
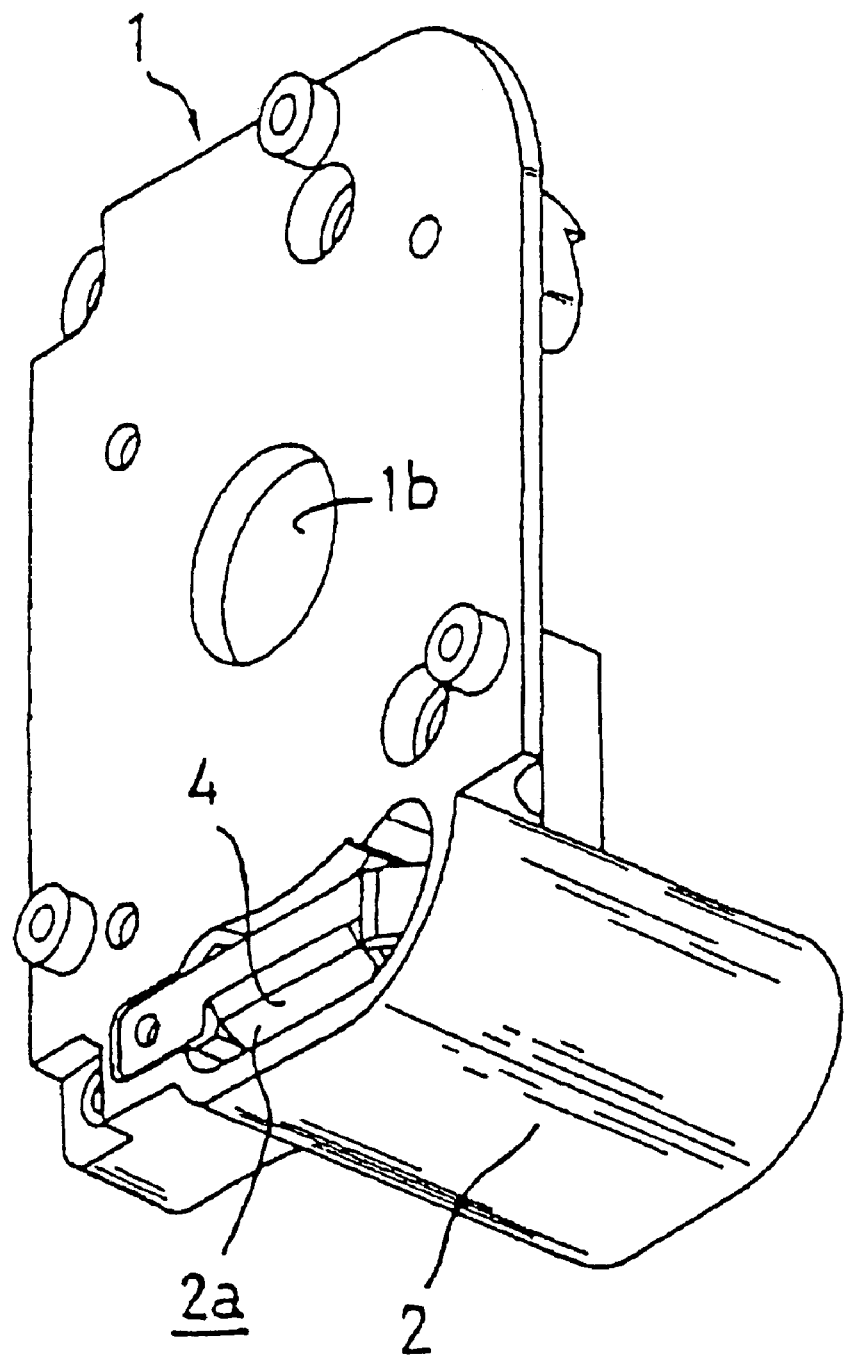
FIG. 6 is a perspective view of the case and the ball-receiving member of the known seat belt spooling device.
Figure 7:
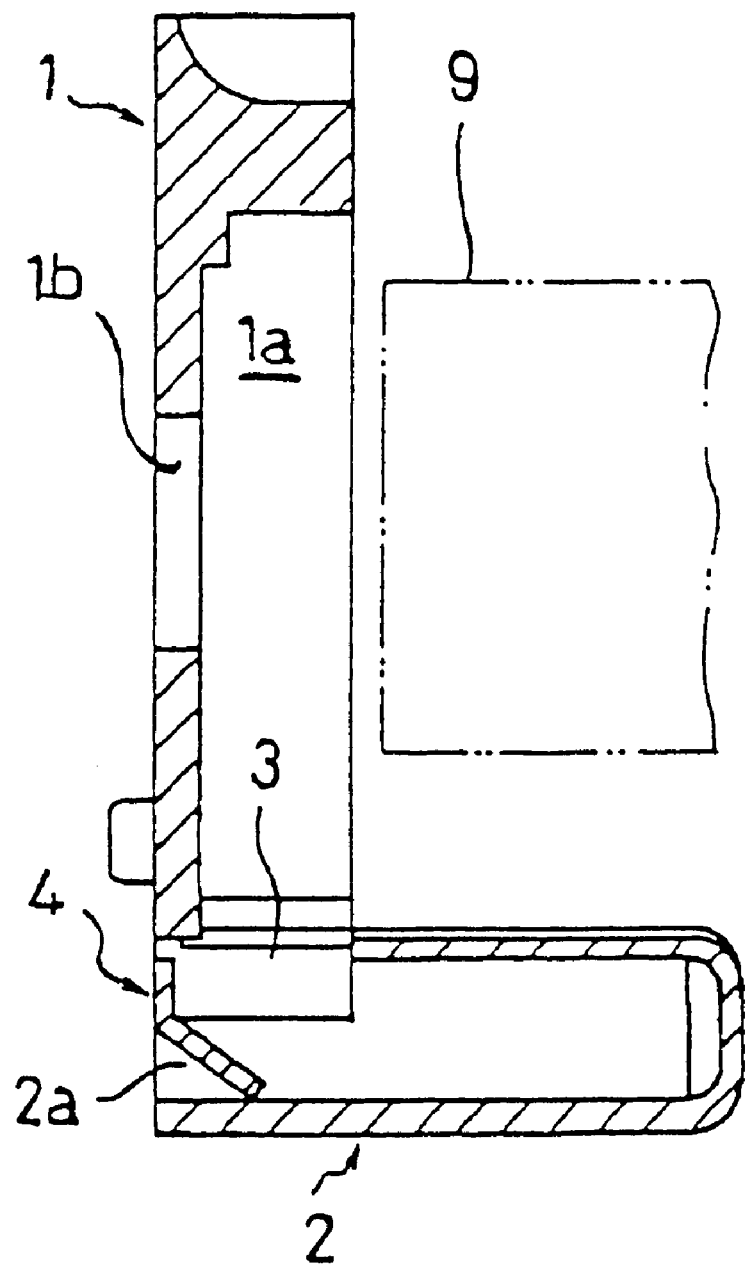
FIG. 7 is a sectional view along line VII—VII of the case and the ball-receiving member of the known seat belt spooling device shown in FIG. 5.

Embodiments according to the present invention are described below with reference to the drawings. FIG. 1 is a perspective view of a case and a ball-receiving member of a seat belt spooling device according to an embodiment of the present invention. FIG. 2 is a perspective view from the opposite side of the case and the ball-receiving member shown in FIG. 1. FIG. 3 is a left side view of an assembly of the case and the ball-receiving member of the seat belt spooling device according to the embodiment. FIG. 4 is a sectional view along line IV—IV of the assembly shown in FIG. 3.

Figure 8:
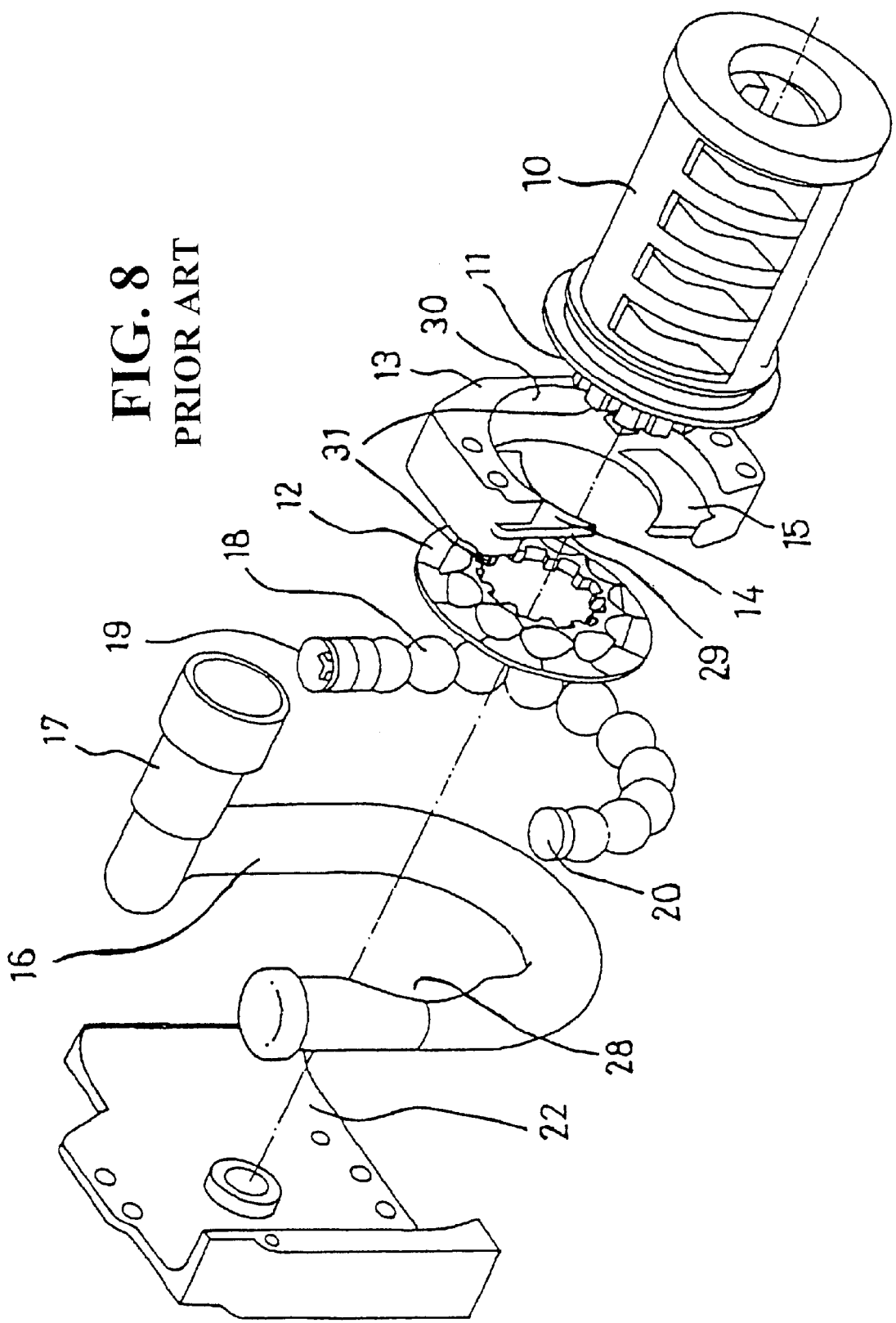
FIG. 8 is an exploded perspective view of the known seat belt spooling device.
Figure 9:
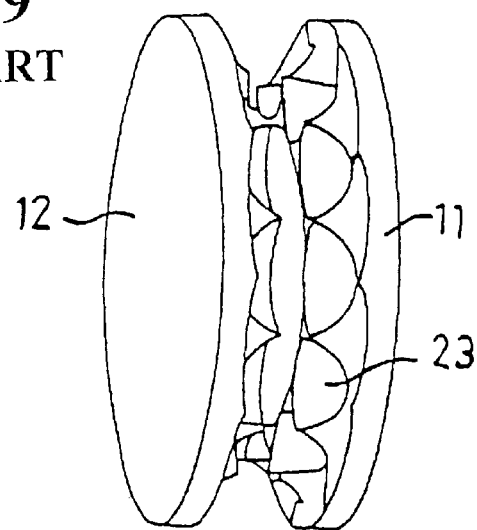
FIG. 9 is a perspective view of driving wheels of the known seat belt spooling device shown in FIG. 8.
Figure 10:
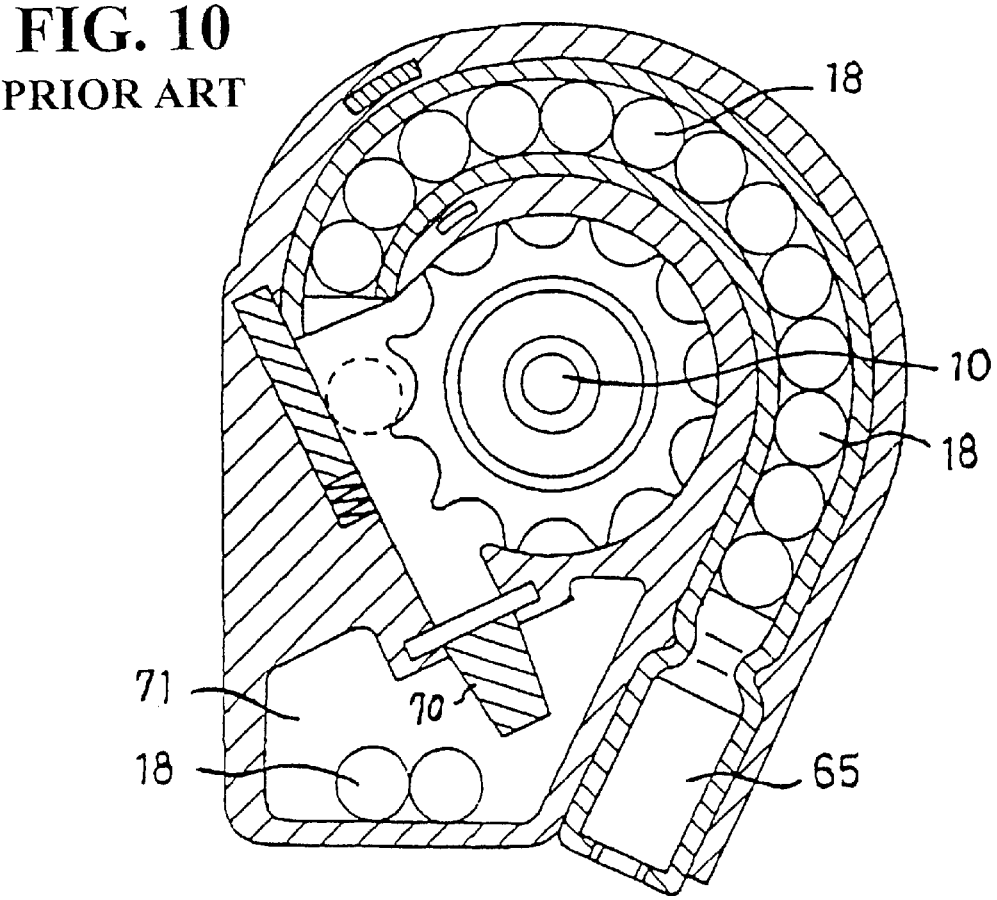
FIG. 10 is a sectional view of another known seat belt spooling device.

The case and ball receiving member shown in FIG. 1 are configured and adapted to be used in a typical seat belt spooling device, such as shown in FIGS. 8 and 9.

According to present invention, a case 1 and a ball-receiving member 2 are formed integrally with each other by die-casting in a light metal such as aluminum. The ball-receiving member 2 according to the embodiment has an opening 2b at the end thereof away from the case 1. The ball-receiving member 2A is provided with an inclined guide face 5 at the base end of the ball-receiving member 2A. A pretensioner including the balls is disposed in a concave part 1a of the case 1. The guide face 5 is provided at one end of passage 20 for retaining the balls. The passage 20 is integrally formed into the ball receiving member 2A and includes a wall having a substantially circular cross section to conform to the shape of the balls. The wall of the passage is integrally connected or attached to the inclined surface or guide face 5. One end of the passage includes a first opening or ball passing port 3. The other end of the passage includes a second opening 2b facing the casing. The first and second openings are preferably positioned to face directions approximately ninety degrees apart.

An insert die which is used when die-casting the case 1 and the ball-receiving member 2A is inserted and is removed through the opening 2b. The inner size of the passage 20 increases toward the opening 2b so as to provide a draft angle for removing the core.

The case 1 is disposed along the outer side face of a left sidewall 6a of a frame 6. The frame 6 includes the left sidewall 6a, a right sidewall 6b opposing the left sidewall 6a, and a rear plate 6c connecting the left sidewall 6a and the right sidewall 6b, the frame 6 being formed in a U-shape. The right sidewall 6b of the frame 6 downward extends and opposes the second opening 2b so as to prevent the balls from removing from the opening 2b.

A spring case containing a return spring is disposed outside the case 1. A locking structure for locking a reel in an emergency is provided at the outside of the right sidewall 6b. As shown in FIG. 4, teeth with which a pawl of the locking structure mates are provided along the inner periphery of an aperture 7 formed in the right sidewall 6b.

In the seat belt spooling device, when the automobile collides, a gas generator of the pretensioner ejects gas, the balls are moved by pressure of the gas, the reel rotates in the seat belt spooling direction by a predetermined number of rotation, a seat belt is spooled by a predetermined length, and pretension is thereby applied to the seat belt. The balls enter into the ball-receiving member 2A through a passing port 3, and are guided to the end of the passage 20 by the inclined surface or guide face 5.

After the pretensioner operates, the seat belt is drawn in the drawing direction. However, the locking structure operates, and the reel is prevented from rotating in the seat-belt-drawing direction by the pawl mating with the teeth formed along the inner periphery of the aperture 7.

As described above, in the pretensioner of the seat belt spooling device according to the present invention, in which the case and the ball-receiving member are formed integrally with each other, a guide for guiding the balls which enter into the ball-receiving member from the case can be formed integrally with the ball-receiving member, thereby reducing the number of components and the assembling cost.

The priority application, Japanese Patent Application Serial No. 2000-181772, filed Jun. 16, 2000 is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt spooling device comprising:

a frame including first and second sidewalls;

a reel disposed between the sidewalls, for spooling a seat belt;

wherein the reel is biased to rotate in the spooling direction;

a pretensioner for driving the reel to rotate in the spooling direction in an emergency; and a locking structure for locking the reel in the emergency, wherein the pretensioner comprises:

a driving wheel connected to the reel;

balls disposed along the first sidewall and around the periphery of the driving wheel;

a gas generator for applying pressure of gas to the balls so as to move around the periphery of the driving wheel; and a ball-receiving member for receiving the balls which move into the ball-receiving member, wherein the ball-receiving member extends from said first sidewall to said second sidewall, and an opening is formed toward an end in the extending direction of the ball-receiving member, the opening opposing said second sidewall.

2. A seat belt spooling device according to claim 1, further comprising a guide surface integrally formed with the ball-receiving member for guiding the balls which move into the ball-receiving member.

3. A seat belt spooling device according to claim 1, wherein a case disposed around the periphery of the driving wheel, for supporting the balls, is formed integrally with the ball-receiving member.

4. A seat belt spooling device according to claim 3, wherein the case and the ball-receiving member are formed by casting.

5. A seat belt spooling device comprising:

a pretensioner having a plurality of balls;

a ball receiving member positioned to receive the balls following operation of the pretensioner;

wherein the ball receiving member includes a passage for retaining the balls and an inclined surface for guiding the balls into the passage;

wherein the inclined surface is integrally attached to a wall of the passage; and wherein the passage includes a first opening at a first end of the passage and a second opening at a second end of the passage.

6. The device of claim 5, wherein the second opening is blocked by a frame supporting a drive shaft for a spool.

* * * * *